United States Patent
Rollet (10) Patent No.: US 10,382,342 B2
(45) Date of Patent: Aug. 13, 2019

(54) CLASSIFICATION DEVICE AND METHOD OF PERFORMING A REAL-TIME CLASSIFICATION OF A DATA STREAM, COMPUTER PROGRAM PRODUCT, AND SYSTEM

(71) Applicant: MITSUBISHI ELECTRIC CORPORATION, Tokyo (JP)

(72) Inventor: Romain Rollet, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/554,975

(22) PCT Filed: Feb. 4, 2016

(86) PCT No.: PCT/JP2016/054044
§ 371 (c)(1),
(2) Date: Aug. 31, 2017

(87) PCT Pub. No.: WO2016/140033
PCT Pub. Date: Sep. 9, 2016

(65) Prior Publication Data
US 2018/0048578 A1  Feb. 15, 2018

(30) Foreign Application Priority Data

Mar. 5, 2015  (EP) .................................. 15305344

(51) Int. Cl.
*H04L 12/851* (2013.01)
*H04L 12/26* (2006.01)
(Continued)

(52) U.S. Cl.
CPC ........ *H04L 47/2441* (2013.01); *H04L 43/026* (2013.01); *H04L 43/028* (2013.01);
(Continued)

(58) Field of Classification Search
CPC ..... H04L 47/2441; H04L 69/16; H04L 69/04; H04L 67/42; H04L 67/02; H04L 69/22;
(Continued)

(56) References Cited

U.S. PATENT DOCUMENTS 7,835,361 B1  11/2010  Dubrovsky et al.
8,813,221 B1*  8/2014  Dubrovsky ......... H04L 63/1408
726/22

(Continued)

FOREIGN PATENT DOCUMENTS

EP  1 868 321 A1  12/2007
JP  2013-243694 A  12/2013

OTHER PUBLICATIONS

Sarang Dharmapurikar et al., "Robust TCP Stream Reassembly in the Presence of Adversaries", Proceedings of the Usenix Security Symposium, Jul. 31, 2005, 16 pages.

*Primary Examiner* — Robert C Scheibel
(74) *Attorney, Agent, or Firm* — Birch, Stewart, Kolasch & Birch, LLP (57) ABSTRACT

A method of performing a real-time classification of a data stream exchanged between a client and a server over a telecommunications network, comprises: receiving a data segment of the data stream indicating a data offset; updating a bitmap table with the received data segment, wherein the bitmap table comprises a number of blocks of data, the data blocks being ordered by block sequence numbers in the bitmap table; after updating the bitmap table, performing measurements on a complete data block to obtain at least one measurement result without waiting for all the data blocks having block sequence numbers that are lower than the first block sequence number to be completed; performing a statistical analysis based on measurement results obtained for several complete blocks; classifying the data stream into (Continued)

one group among a plurality of groups, based on the performed statistical analysis at least.

15 Claims, 7 Drawing Sheets

(51) Int. Cl.
*H04L 29/06* (2006.01)
*H04L 29/08* (2006.01)
*H04L 12/24* (2006.01)

(52) U.S. Cl.
CPC ............... *H04L 43/04* (2013.01); *H04L 67/02* (2013.01); *H04L 67/42* (2013.01); *H04L 69/04* (2013.01); *H04L 69/16* (2013.01); *H04L 69/22* (2013.01); *H04L 41/142* (2013.01); *Y02D 50/30* (2018.01)

(58) Field of Classification Search
CPC ..... H04L 43/04; H04L 43/028; H04L 43/026; H04L 41/142; Y02D 50/30
See application file for complete search history.

(56) References Cited

U.S. PATENT DOCUMENTS

| | | | |
|---|---|---|---|
| 2002/0129140 A1* | 9/2002 | Peled | H04L 63/0245 709/224 |
| 2007/0291662 A1* | 12/2007 | Mangin | H04L 63/1441 370/252 |
| 2010/0260048 A1* | 10/2010 | Dolganow | H04L 43/028 370/235 |
| 2015/0052601 A1* | 2/2015 | White | H04L 63/1416 726/13 |

* cited by examiner

CLASSIFICATION DEVICE AND METHOD OF PERFORMING A REAL-TIME CLASSIFICATION OF A DATA STREAM, COMPUTER PROGRAM PRODUCT, AND SYSTEM

TECHNICAL FIELD

The present invention generally relates to data analysis in communication networks, and more precisely to the classification of data streams.

BACKGROUND ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The HTTP protocol is standardized as RFC 2616 by the Internet Engineering Task Force (IETF) and is transported over the TCP/IP stack (Transport Control Protocol/Internet Protocol).

HTTP is used for implementing numerous services. Indeed, more and more applications run within a web browser and their communications are based on HTTP.

One advantage of HTTP is simplicity since this protocol supports a small number of request methods, and basically applications use two or three request methods (mainly methods called GET and POST).

Many applications make use of HTTP as a session protocol to convey different types of media such as simple text files, office documents, audio and video files.

In what follows, files or data streams transported by HTTP will be referred to as HTTP contents.

According to the HTTP protocol, the HTTP content is inserted into an HTTP body part (or payload) of an HTTP message, and an HTTP header part contains control information of the HTTP message.

Prior to the transmission of the HTTP message, the HTTP content can be compressed or encrypted by the applications in order to either reduce the volume format or secure the transmission.

For instance, audio and video media are compressed by means of audio/video codecs. For the same purpose, a packet archive (for instance zip format, rar format, etc) contains a set of compressed files.

In order to improve the HTTP protocol efficiency, some extensions such as persistent connections and pipelining have been developed according to the HTTP protocol standard.

Persistent connection consists in keeping opened the TCP connection that carries the HTTP session between an HTTP client and an HTTP server, after the completion of the HTTP request (after reception of an HTTP response from the server). Then, the HTTP client may send another HTTP request on the same TCP connection.

HTTP pipelining consists in sending several HTTP requests from an HTTP client to an HTTP server over a single TCP connection without waiting for the reception of the corresponding HTTP responses.

Malicious applications such as malware, Trojan or Remote Administration Tools (RAT) also often use HTTP as a carrying protocol for communication between an infected machine and a Command and Control (C&C) server.

These malicious applications may use HTTP to carry stolen information and files, and prior to the transport, they can also carry out compression and/or encryption of the file in order to obfuscate the communication.

Then, it is impossible to decrypt the data stream using an offline process if the encryption key is not known, except by applying a brute force method.

Usually, malicious applications make use of basic obfuscation methods relying on scrambling codes such as XOR-cyphering. However, in some cases, they can apply standard encryption such as AES (Advanced Encryption Standard) or 3DES (Triple Data Encryption Standard). In these cases, it may be necessary to identify in real-time what load of data is exchanged between the HTTP client and the HTTP server.

This requires that the suspicious contents are quickly analysed by a traffic analyser located between the client and the server. Indeed, the system analysis is preferably performed on the client before the encryption key is erased from the transmitter or receiver system memory by the malicious application.

According to some methods, pattern matching is used to classify a file. For example, the well-known Unix™ utility named "file" is based on pattern matching and uses the libmagic library to output the application related to a given file.

However, such methods are applied on binary files, which are for example stored on a device. However, they cannot be performed in real-time on data streams communicated between a server and an online client.

There is a need to analyse in real-time data streams (such as HTTP contents) carried over a telecommunications network and classify it in different groups (or types) so as to carry out further analysis on data belonging to a given group or to some given groups.

SUMMARY OF INVENTION

To address these needs, a first aspect of the present invention relates to a method of performing a real-time classification of a data stream exchanged between a client and a server over a telecommunications network, the method comprising:

receiving a data segment of the data stream, the data segment indicating a data offset within the data stream;

updating a bitmap table with the received data segment based on the indicated data offset, wherein the bitmap table comprises a number of blocks of data having a predetermined size, the data blocks being ordered by block sequence numbers in the bitmap table;

after updating the bitmap table, if at least one first data block having a first block sequence number is complete, performing measurements on the complete data block to obtain at least one measurement result without waiting for all the data blocks having block sequence numbers that are lower than the first block sequence number to be completed;

performing at least one statistical analysis based on measurement results obtained for several complete blocks;

classifying the data stream into one group among a plurality of groups, based on the performed statistical analysis at least.

Because the data blocks on which the statistical analysis is performed are potentially out-of-order, only a partial re-assembly of the data stream is performed.

Therefore, the invention proposes advantageously to combine partial re-assembly of a data stream with the use of statistical analysis performed on possibly out-of-order data blocks of the data stream. Performing a partial re-assembly requires less memory and computational power. In addition, it enables performing the statistical analysis in real-time, which reduces the latency and accelerates the classification of a data stream. The classification of the data stream can be used by a central supervisor to generate some alarm events when suspicious data streams are detected, to apply filtering policies to the clients or to interact with software agent installed on the client to gather system information.

As explained hereafter, the data segment may be a TCP data segment.

According to some embodiments of the invention, for the first K bytes of the data stream, K being a predetermined number, the method further comprises:

re-assembling the data blocks comprising the first K bytes of the data stream to obtain data blocks ordered according to their respective block sequence numbers;

after the first K bytes of the data stream have been received and re-assembled, performing at least one Deep Packet Inspection, DPI, analysis on the K first bytes of the data stream;

the data stream is classified into a group based on the performed statistical analysis and on the DPI analysis.

Therefore, these embodiments advantageously combine statistical classification analyses with deterministic DPI analyses, which improve the accuracy of the classification as a greater number of groups can be distinguished.

According to some embodiments, the plurality of groups comprises a cleartext data group and at least one non-cleartext data group, the measurements performed on the complete data block comprise determining the entropy of said data block, and the statistical analysis comprises determining a global entropy value for the data stream. If the global entropy value is greater than a predetermined entropy threshold, the data stream is classified as belonging to the non-cleartext data group.

Determination of the entropy is not costly in terms of computational resources and enables to classify a data stream as comprising cleartext data or non-cleartext data (compressed data or encrypted data).

In complement, if the global entropy value is lower than the predetermined entropy threshold, the data stream can be classified as belonging to the cleartext data group.

Alternatively or in complement, if the global entropy value is lower than the predetermined entropy threshold, the DPI analysis comprises a cleartext pattern detection to find a cleartext pattern in the data stream, and, if a cleartext pattern is found in the data stream, the data stream is classified as a known cleartext format group, the known cleartext format group being a subgroup of the cleartext data group.

Using deterministic analyses (DPI analyses) in complement to statistical analyses enable to improve the accuracy of the classification.

Still in complement, if no cleartext pattern is found in the data stream, the DPI analysis may further comprise a text file identification analysis to find a character set in the data stream, and:

if a character set is found in the data stream, the data stream can be classified as belonging to a text encoding group or to the known cleartext format group;

else the data stream can be classified as belonging to an obfuscated data group or to an unknown cleartext format group.

Using deterministic analyses (DPI analyses) in complement to statistical analyses enable to improve the accuracy of the classification.

According to some embodiments of the invention, the non-cleartext data group comprises at least an encryption group, and the measurements further comprise performing an estimation of the CHI-square deviation of the complete blocks, and the statistical analysis may further comprise, for each complete block:

determining a CHI square deviation of said complete block;

comparing the determined CHI-square deviation to a predetermined deviation threshold;

if the determined CHI-square deviation is greater than the predetermined deviation threshold, incrementing a counter value.

Then, if the counter value is less than a predetermined integer N (and provided a sufficient number of complete blocks were analysed, as explained hereafter), the data stream can be classified into the encryption group.

CHI-square deviation analysis is not costly in terms of computational resources and enables to distinguish between compressed data group and encryption group. Furthermore, its computation can be combined with entropy calculation in order to reduce required computational resource.

According to some embodiments, if the counter value is less than a predetermined integer N, the data stream can be classified into the encryption group, the DPI analysis comprises a XOR pattern scan to find a XOR pattern in the data stream. Then, if a XOR pattern is found in the data stream, the data stream can be classified into an obfuscated group, and if no XOR pattern is found in the data stream, the data stream can be classified into an encrypted data group, the obfuscated group and the encrypted data group being subgroups of the encryption group.

Using deterministic analyses (DPI analyses) in complement to statistical analyses enable to improve the accuracy of the classification.

In complement, if the counter value is more than the predetermined integer N, the DPI analysis may comprise compressed pattern identification over the first K bytes of the data stream to find a compressed pattern in the data stream. Then, if a compressed pattern is found in the data stream, the data stream can be classified into a known compressed format group and if no compressed pattern is found in the data stream, the data stream can be classified in an obfuscated group or in an unknown compressed format group.

Using deterministic analyses (DPI analyses) in complement to statistical analyses enable to improve the accuracy of the classification.

According to some embodiments of the invention, the method can further comprise transmitting an indication of the group into which the data stream is classified to a central supervisor in charge of applying filtering policies to data streams exchanged between the client and the server.

As already explained, the transmitted indication is relevant information that can be advantageously used by other entities of the telecommunications system.

According to some embodiments, after having received the first K bytes of the data stream, K being a predetermined integer, the method may comprise storing the first K bytes in a temporary buffer. The stored first K bytes are re-assembled, and the DPI analysis can be performed on the re-assembled stored first K bytes after the statistical analysis.

Performing the DPI analyses after the statistical analyses enable to spare computational resources. Indeed, as explained above, the DPI analyses that are useful for classifying a data stream depends on preliminary results of the statistical analysis. This embodiment therefore enables to avoid performing all the different DPI analyses: only the relevant ones are performed.

According to some embodiments, the bitmap table has a fixed size (at least equal to a TCP window size as advertised in the analyzed TCP data segments) and starts at a bottom of window, and the method can further comprise, upon reception of an acknowledgment message exchanged between the server and the client, the acknowledgment message indicating a new bottom of window, updating the bitmap table so that the bitmap table starts at the indicated new bottom of window.

This enables to maintain an updated bitmap table that comprises data that has not been acknowledged by the receiver of the data stream.

A second aspect of the invention concerns a computer program product comprising a computer readable medium having stored thereon computer program instructions loadable into a computing device and adapted to—when loaded into and executed by said computing device—cause the computing device to perform a method according the first aspect of the invention.

A third aspect of the invention relates to a classification device performing a real-time classification of a data stream exchanged between a client and a server over a telecommunications network, the classification device comprising:

an input interface for receiving a data segment of the data stream, the data segment indicating a data offset within the data stream;

a processor, the processor being configured for performing the following steps:
updating a bitmap table with the received data segment based on the indicated data offset, wherein the bitmap table comprises a number of blocks of data having a predetermined size, the data blocks being ordered by block sequence numbers in the bitmap table;
after updating the bitmap table, if at least one first data block having a first block sequence number is complete, performing measurements on the complete data block to obtain at least one measurement result without waiting for all the data blocks having block sequence numbers that are lower than the first block sequence number to be completed;
performing at least one statistical analysis based on measurement results obtained for several complete blocks;
classifying the data stream into one group among a plurality of groups, based on the performed statistical analysis at least.

A fourth aspect of the invention concerns a system comprising a classification device according the third aspect of the invention and a central supervisor, wherein the classification device is configured to transmit an indicator of the group into which the data stream has been classified, and wherein, upon reception of the indicator, the central supervisor is configured to apply filtering rules in the telecommunications network based on the received indicator.

DESCRIPTION OF EMBODIMENTS

Figure 1:
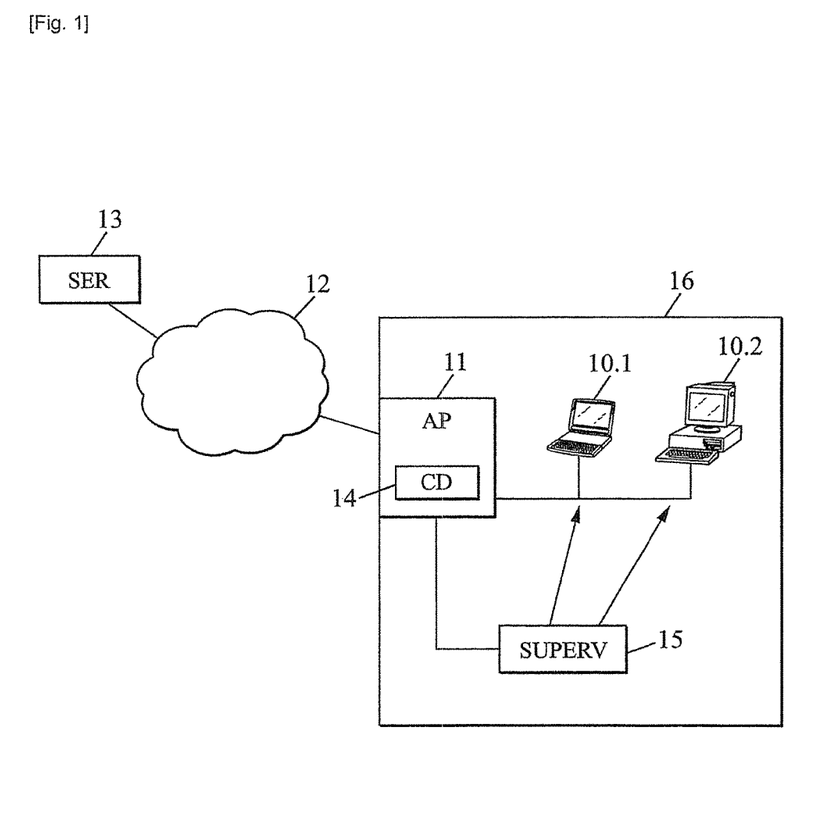
FIG. 1 represents a telecommunications system according to one embodiment of the invention.

FIG. 1 illustrates a system according to an embodiment of the invention.

The system comprises several clients 10.1 and 10.2, which can be for example a laptop 10.1 and a desktop computer 10.2, belonging to a Local Access Network 16.

No restriction is attached to the clients 10.1 and 10.2, which can be any user devices, such as laptops, a desktop computers, touch panels or Smartphones.

The clients 10.1 and 10.2 can access to a telecommunications network 12, such as the Internet, via an access point 11.

On FIG. 1, the access point 11 is accessed via wired means. However, the access point 11 can also be a wireless access point, which can be accessed by clients 10.1 and 10.2 via Wi-fi for example.

The clients can therefore exchange data streams (or files) with a server 13 which can be accessed through the access point 11 and the network 12. In what follows, the wordings "file", "content" or "HTTP content" all refer to the data stream exchanged between the server 13 and one of the clients 10.1 and 10.2.

In what follows, the example of the exchange of HTTP contents via the protocol stack HTTP/TCP/IP is considered. The HTTP contents are then transported in TCP segments. No restriction is attached to the protocol stack used for exchanging the files between the clients 10.1 and 10.2 and the server 13.

The access point 11 may comprise a classification device 14 according to an embodiment of the invention. As explained in what follows, the classification device 14 is arranged for classifying data streams (HTTP contents) into one group among a plurality of groups.

The classification device 14 may analyse the data comprised in TCP segments, which are identified using a TCP quadruplet including source and destination IP addresses, and source and destination TCP ports. A TCP context information can be allocated and attached to each newly identified TCP connection. The TCP context information can then be released upon TCP connection closing. According to the invention, the classification performed by the classification device 14 is passive (or transparent): TCP segments are only inspected and are forwarded without being modified. The invention can also be advantageously implemented when persistent connection is used: in what follows, the context of a persistent connection is used for illustrative purposes.

A TCP connection carrying an HTTP session can be monitored while the connection is opened. As explained hereafter, the classification device 14 can use a TCP sequence number and a Content-Length field inserted into either the HTTP request (for upload from the clients 10.1 and 10.2 to the server 13) or into the HTTP response (for download from the server 13 to the clients 10.1 and 10.2), the classification device 14 is able to determine the data offset (the TCP sequence number) on which the next HTTP request will be inserted when persistent connection is used.

The goal of the classification device 14 is to classify the HTTP contents in at least two different groups:
- cleartext data group;
- non-cleartext data group comprising a compressed data group and an encryption group.

The cleartext data group includes not only human readable text streams but also all data streams with non-compressed and non-cyphered formats used by any applications or operating systems such as office software suite, executable applications, etc. The invention is not restricted to the previously mentioned list and the cleartext data group can encompass any non-compressed format. For example, one file format can be defined for each existing application. According to some embodiments of the invention, the cleartext data group can be divided in several subgroups:
- known cleartext format group, which refers to data formats recognized by the classification device 14;
- unknown cleartext format group.

Compressed data can be generated by packing applications such as WinZip, rar, or can be also used to store multimedia content for pictures (JPEG, PNG, GIF, etc), audio (MP3, FLAC, OGG, etc) and video (MPEG2, H.264, H.265, etc). Different media can be mixed in a container format such as AVI, MP4 or MKV. Compressed data can generally be decoded without requiring any further information, provided the compression method and the file format are known. As for the cleartext data group, the compressed data group can be divided in two subgroups, i.e. a known compressed data group and an unknown compressed data group.

Encryption is generated by encryption algorithms that encode data in such a way that only authorized parties can read the encrypted data.

As already explained, encryption can also be used by malicious third parties to hide the leaked data stream and obfuscate it. Encrypted data can be decrypted only if the decryption key is known. Usually, data streams exchanged over a telecommunications network are protected using a symmetric key encryption method, where encoding and decoding are the same. The key is previously exchanged between the transmitter and the receiver (the server 13 and the client 10.1 or 10.2) using a more costly asymmetric key encryption (public/private key). Then, as the key is not exchanged in cleartext, the only way to access the key is to analyse the memory in either the transmitter or the receiver, and extract it in order to decrypt the exchanged encrypted data.

Optionally, the encryption group can be divided into at least three subgroups:
- true encryption schemes (called encrypted data group) such as AES, 3DES, etc;
- obfuscation schemes (called obfuscated data group) such as XOR encoding;
- encoding methods (called text encoding group) used to transmit binary messages over medias supporting only ASCII characters (for example base64).

Identification of these three subgroups can be useful in order to optimize system analysis and to reduce the number of operations.

As illustrated on FIG. 1, the classification device 14 is included in the access point 11. This is advantageous as the classification device 14 can then analyse all data streams between the LAN 16 and the server 13.

The classification device 14 can also be located outside the access point 11, provided it can access to the data streams exchanged between the clients 10.1 and 10.2 and the server 13.

The result of the classification (an indicator of the determined group in which the data stream has been classified) can be transmitted to a central supervisor 15, which can perform further analysis and/or apply restriction policies to the clients 10.1 and 10.2 and/or access to information stored in the clients 10.1 and 10.2, as explained hereafter. Alternatively, the classification device 14 can transmit alarm events to the central supervisor 15 when suspicious data streams are detected. Alarm events can then be collected by the central supervisor 15 to be analysed, displayed to an administrator and/or to apply miscellaneous filtering policies in the LAN 16. Optionally, the central supervisor 15 may also interact with software agents installed on each of the clients 10.1 and 10.2 to gather system information.

On FIG. 1, the central supervisor 15 has been illustrated as belonging to the LAN 16. However, the central supervisor 15 can be located outside the LAN 16. In that case, it can be accessed by and can access to the clients 10.1 and 10.2 via the telecommunications network 12.

Several classification methods can be carried out by the classification device 14 to classify the data streams in the different groups.

First Category of Classification Methods: Statistical Methods

A first category of classification methods is based on statistical analysis such as entropy estimation or CHI-square distribution deviation measurements. Although these methods are well known as such, they are briefly described hereafter.

Entropy Estimation:

The main characteristics of a file comprising compressed data is high entropy, which means a high average amount of information (or information density) contained in the file. An entropy rate of a data source means the average number of bits per symbol (i.e. byte) needed to encode it. According to Shannon, the entropy H of a discrete random variable X having a set of possible values $\{x_1, x_2, \ldots, x_n\}$ and a probability mass function $P(X)$ is given by the following formula:

$$H(X) = -\sum_i P(x_i) \log_b P(x_i)$$

Usually, the fact of compressing data in a file results in increasing entropy up to a maximum of 8 bits per byte (perfect lossless compression).

Non-compressed files used by most applications have lower entropy levels. For instance, a text ASCII file such as a C-source file has an entropy of about 4.9 bits, resulting in a potential file reduction of 39% since the number of bits per symbol skips from 4.9 to 8. Typical X86 Windows™ executable files have an entropy of 6.3 bits per byte. At least, typical Microsoft-Word™ non-compressed document files have an entropy of around 4.1 bits per byte.

Therefore, entropy estimation is a good indicator to distinguish between cleartext data and compressed data. However, encrypted data have also a high entropy average, and this indicator is therefore not sufficient to distinguish between different non-cleartext data streams.

CHI-square Deviation:

The CHI-square distribution method is used to test for the randomness of data and is extremely sensitive to errors in pseudorandom sequence generators. Consequently, the CHI-square distribution method can be used as a satisfying criterion to distinguish between the encryption data group and the compressed data group.

Indeed, compression algorithms might insert tags to comply with some formats. Consequently, the generated files are less random than the files produced by encryption methods. In other words, the distribution of symbols (bytes) can be compared to the uniform distribution by calculating a $x^2$ statistics; which can be expressed as follows:

$$x^2 = \sum_i \frac{(O_i - E_i)^2}{E_i}$$

where $O_i$ is the number of appearances of a symbol of index i in the file (also called frequency of the symbol of index i);

$E_i$ is an expected theoretical frequency of the symbol of index i;

In our case, we compare the observed distribution with a uniform distribution for the 256 possible symbols (ASCII characters), so $$E_i = \frac{1}{256}.$$

By calculating the CHI-square deviation over some short data blocks of the data stream, comparing the CHI square deviation to a threshold and counting the number of blocks for which the CHI-square deviation exceeds the threshold over a significant part of the data stream, imperfections in the pseudorandom sequence generated by a compression algorithm can be detected.

This latest method can be applied to analyze on-the-fly data streams, as it can be applied to short blocks (32 or 64 bytes for example) and as it does not require analyzing in-sequence data, thereby avoiding TCP segment full re-assembly that is costly in terms of memory and latency. It also reduces the required calculation power.

The first group of methods (statistical methods comprising entropy estimation and CHI-square deviation) does not require having access to in-order data packets because ordering the packets will not modify the statistics. Data can be provided to those methods in the form of blocks of data having a fixed length. However, these methods generally require analysing the whole data stream.

Second Category of Classification Methods: Deterministic Methods

A second category of classification methods comprises methods that are based on Deep Packet Inspection (DPI) analysis such as protocol parsing and pattern matching algorithm. These methods require having access to in-order data but they do not require the complete file to be analysed. Indeed, a file format can be identified by identifying short specific data sequences over the K first bytes of a data stream.

Pattern Detection

File format identification (and therefore file classification) can be done by applying pattern detection, which consists in finding short known patterns listed into a database, in the beginning of a data stream (first K bytes, K being equal to 1000 for example).

The pattern detection method is implemented for example by the Unix™ utility file and is called "magic test". For a given file, it is able to retrieve the corresponding application based on a "libmagic" database. The database defines for each file format some testing rules to be applied to bytes, words, at specified file offsets. Such a method is deterministic and is efficient on a large number of different formats, including compression binary formats (ZIP, rar, etc). However, it requires a processing that is more complex and costly than those of the statistical analysis methods. Therefore, as explained hereafter, some embodiments of the invention advantageously propose to use pattern detection in complement to the statistical analysis methods to classify a file between known and unknown sub-groups of the cleartext data group and of the compressed data group.

Text File Identification:

Pattern detection based on a database (as described above) is efficient on binary files. However, it is not able to detect text data streams since there is no predetermined pattern in such a data stream. Consequently, an additional deterministic method can be implemented to test the ASCII character set, UTF-8 or any other character encoding method. Text file identification is used in the present invention only when the previously exposed pattern detection method has failed. To be perfectly reliable, text file identification is preferably applied to the whole file since a file may comprise text parts and binary parts. However, as this kind of file is quite uncommon, the text file identification may advantageously be applied to the beginning of the file only (the first K bytes for example).

XOR-cyphered File Detection:

An efficient detection method is known to detect the length of a XOR key that was used to encode the data stream but it requires the knowledge of a pattern in the cyphered data stream. For instance, in a Microsoft-Windows™ executable file, known patterns can be systematically found, such as "This program cannot be run in DOS mode". Using some fundamental properties of the XOR operation, the number of operations can be reduced to a single XOR-pattern scan for each possible XOR key length. A XOR-pattern scan for a key length L consists in applying a XOR transformation to the data stream and searching into the transformed data stream some known patterns that are pre-calculated for the given XOR key length L. It requires that the searched patterns have a length greater than the XOR keys.

This approach can be used to detect XOR cyphered files that systematically include a known pattern. Usually, malwares use short XOR keys (for example 32 bits) so that this approach can be efficiently coupled with the pattern detection approach described above.

The above mentioned two categories of classification methods are not further detailed as they are, as such, well known. As explained hereafter, the invention proposes a method combining these classification methods, while optimizing the combination for real-time analysis of at least one file communicated between the server 13 and the clients 10.1-10.2.

Figure 2:
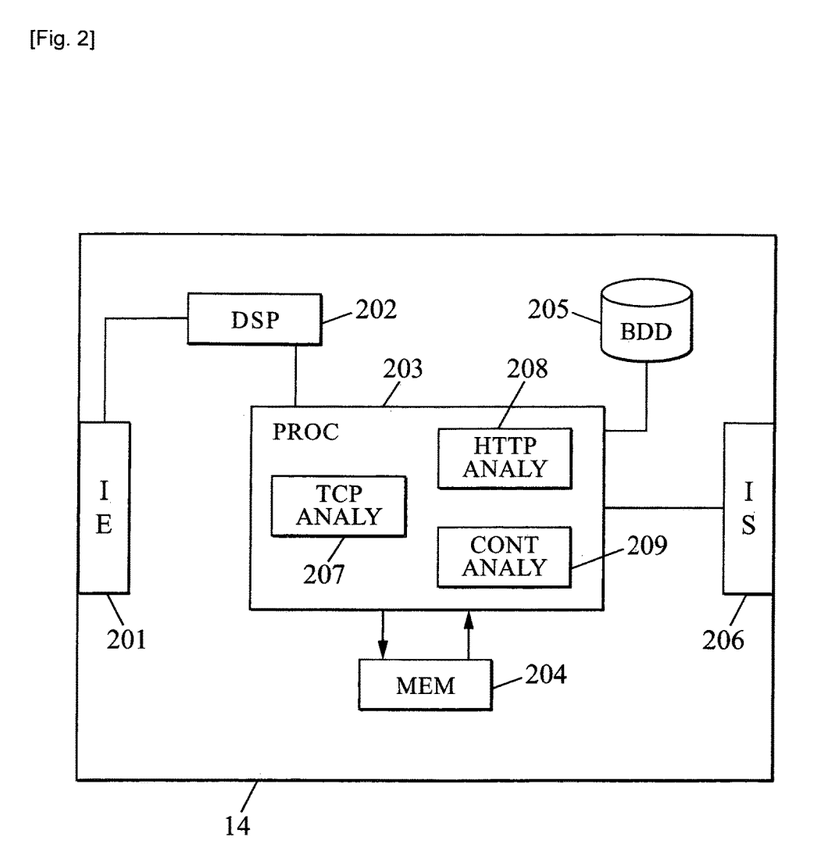
FIG. 2 represents a classification device according to one embodiment of the invention.

FIG. 2 shows a classification device 14 according to an embodiment of the invention.

The classification device 14 comprises a processor 203 and a random access memory 204 that can store instructions for performing the steps of a method as described hereafter.

The classification device 14 may also comprise a database 205 for storing data resulting from the method according to the invention. For example, the database 205 may store a classification result (an indicator of the group to which a data stream belongs) in association with a TCP quadruplet identifying a data stream.

The classification device 14 comprises an input interface 201 for receiving HTTP contents (or more generally any data stream) exchanged between the clients 10.1 and 10.2, and the server 13. It also comprises an output interface 206 arranged for forwarding the HTTP contents received on the input interface 201 and also for transmitting data to the central supervisor 15 as explained hereafter.

The classification device 14 may also comprise a Digital Signal Processor 202.

The processor 203 includes a TCP analysis unit 207 in charge of receiving TCP packets, monitoring the state of each opened TCP connection, re-assembling TCP data segments that convey HTTP contents and forwarding the data segments to an HTTP analysis unit 208 or to a data stream analysis unit 209 (also called content analysis unit 209), according to the state of the TCP connection. As detailed hereafter, the re-assembly performed by the TCP analysis unit 207 may be a partial TCP re-assembly.

The HTTP analysis unit 208 is configured to identify HTTP sessions so that the TCP analysis unit 207 can skip the TCP connections carrying other protocols of layer 5. This is given as a specific example and does not restrict the invention to an HTTP/TCP/IP protocol stack, as already explained. For a HTTP session, the HTTP analysis unit 208 parses the HTTP header of a HTTP packet in order to get relevant information such as the Content-Length header that indicates the length of the HTTP body. The HTTP analysis unit 208 may also extract the HTTP body for further analysis by the content analysis unit 209. The HTTP analysis unit 208 preferably supports TCP persistent connection as described in the specification RFC2616.

The content analysis unit 209 is arranged to implement the classification methods of the first and second categories that have been described above, and then classify the data stream received and forwarded by the classification device 14 into a group among a plurality of classification groups.

Figure 3:
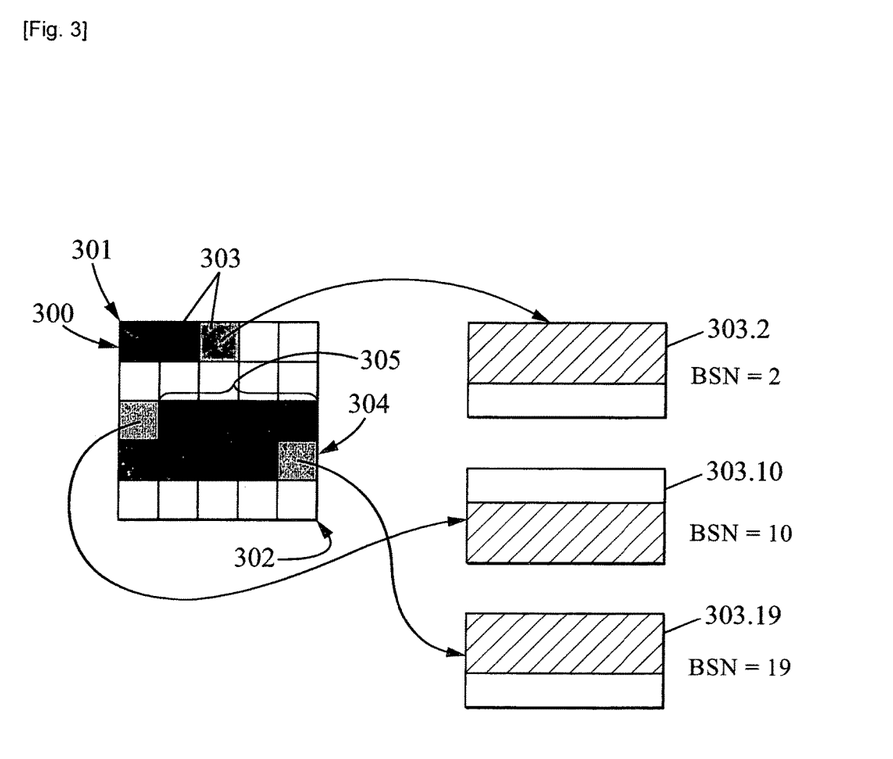
FIG. 3 illustrates a bitmap table for performing partial re-assembly of a data stream according to one embodiment of the invention.

FIG. 3 illustrates a bitmap table 300 according to some embodiments of the invention. The bitmap table 300 is used by the TCP analysis unit 207 to perform partial re-assembly of received data segments.

Partial re-assembly can be based on data blocks 303 of the bitmap table 300, the data blocks being of fixed and short size B, for example 32 or 64 bytes. The bitmap table 300 has a fixed size at least equal to the TCP Window Size (for example equal to the TCP Window Size). The example below with a TCP Window Size equal to 800 bytes and data blocks 303 having a size B of 32 bytes is considered hereafter for illustrative purposes.

Each data block is identified by its offset within the received TCP stream. The offset of each block can be translated as a block sequence number N where:

N=TCP_sequence_number/B;

where TCP_sequence_number is the offset of the first byte (+1 if the first TCP_sequence_number is 0) of the block in the TCP connection;

Reception of each block within the TCP window is monitored using the bitmap table 300 of size TCP_Window_Size /B, i.e. 800/32=25 data blocks.

The bitmap table 300 comprises a bottom of window 301 and an end of window 302.

Each block is indexed by its block sequence number N varying from k to k+24, where k is the block sequence number of the bottom of window 301.

The bottom of window 301 is monitored and allows calculating the bit position (the offset) within the bitmap table of each received data block. The bottom of window 301 is obtained based on the TCP acknowledgment messages (ACKs) returned by the TCP endpoint receiver.

Upon reception of a data sequence 305, encapsulated in a TCP packet indicating a data offset, the bitmap table 300 is updated with the data sequence 305, based on the indicated data offset. For example, in the example of FIG. 3, assuming that the bottom of window 301 has the block sequence number 0 (start of the TCP connection), the data offset of the first byte of the received data sequence may be 350. The integer part of the ratio of 350 divided by 32 being 10, the data sequence covers a portion of the $11^{th}$ data block (block sequence number equal to 10). The length of the data sequence is such that it fills completely the bitmap table from the $12^{th}$ data block to the $19^{th}$. The $20^{th}$ block (block sequence number equal to 19) is also partially filled.

According to the invention, short buffers can be used to temporarily store data of a single block split over two different data segments, as it is the case for data blocks of block sequence numbers 2, 10 and 19.

The size of the buffer is equal to the size of a data block (32 bytes) and several buffers can be used for a single TCP connection when data segments are transmitted out-of-sequence, as it is the case on FIG. 3 (TCP data segments might be lost and retransmitted).

Incomplete data blocks (grey blocks in the bitmap table 300) might be put in a Pending Block list illustrated on the right side of FIG. 3. The Pending Block list corresponds to the short buffers waiting for reception of complementary data present in further received TCP segments. The incomplete blocks are respectively labelled 303.2, 303.10 and 303.19. The hashed area in each of the incomplete blocks 303.2, 303.10 and 303.19 represents received data.

Received blocks are black on FIG. 3, while non-received blocks are white.

When the bottom of window is updated (i.e. upon reception of a TCP acknowledgment message indicating a new bottom of window), the bitmap table 300 may be updated. Bits that are included between the older and the new bottom of window are reset and the updated bitmap table starts at the new bottom of window.

Partial re-assembly consists in obtaining blocks of ordered data (data that is ordered inside a block), without requiring blocks to be ordered according to their respective block sequence numbers.

Figure 4:
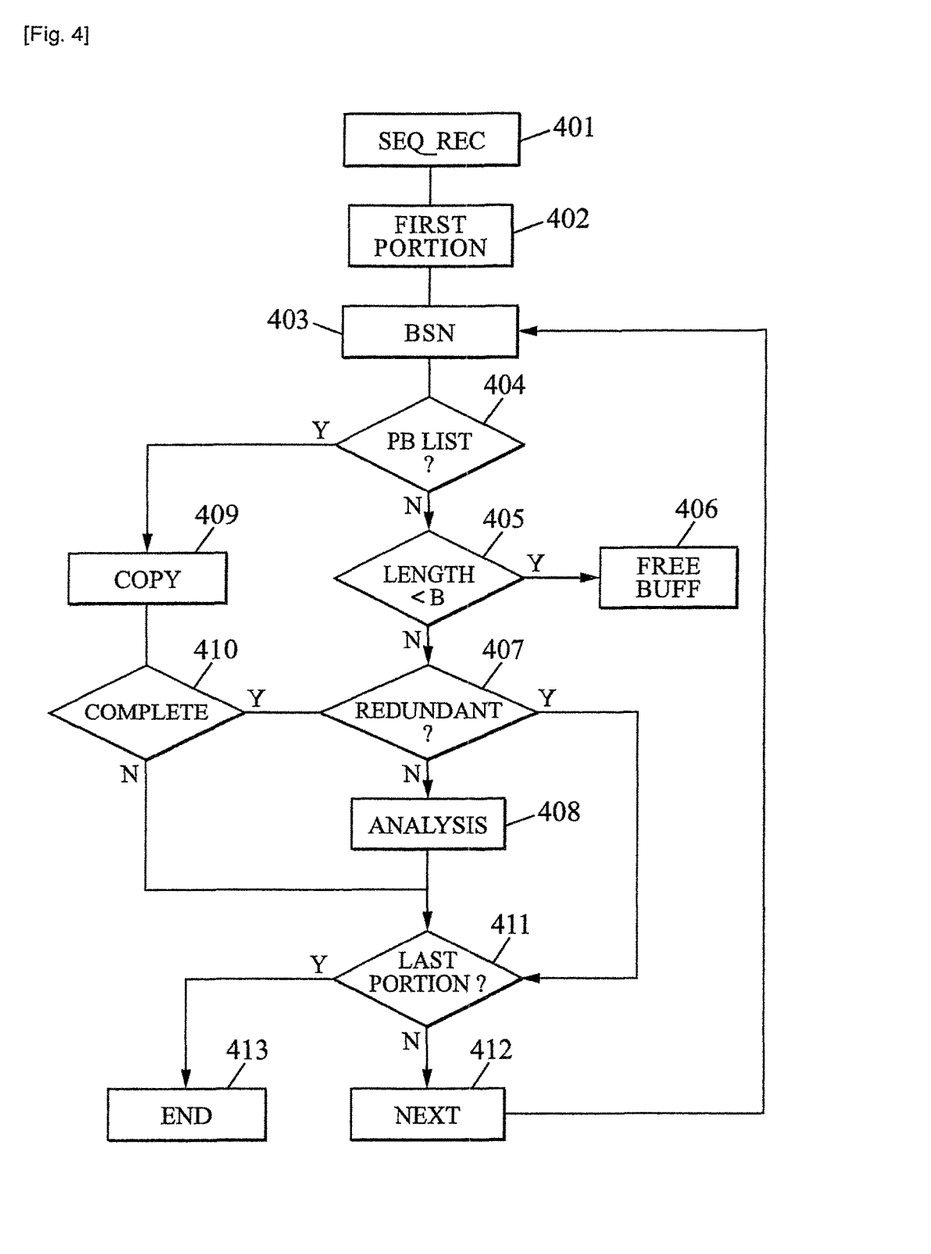
FIG. 4 illustrates the steps performed by a TCP analysis unit according to one embodiment of the invention.

FIG. 4 is a diagram illustrating steps of a method according to some embodiments of the invention. In particular, it shows the steps that are performed by the TCP analysis unit 207 upon reception of a data sequence belonging to the HTTP body which is to be partially re-assembled to feed the content analysis unit 209. Data is provided to the content analysis unit 209 as blocks of fixed data: within each block, data is in order, and blocks can be transmitted out-of-order to the content analysis unit 209.

At step 401, a data segment is received, the data segment indicating a data offset and a segment size.

At step 402, based on the data offset, a first portion of the data segment is determined to fill a data block of the bitmap table 300 (for example, on FIG. 3, the first portion of the data segment 305 comprises the data inserted in the data block 303.10). The length of the first portion is equal to or is less than the length B of a data block of the bitmap table 300.

At step 403, the block sequence number BSN of the data block to be filled with the first portion is determined. To this end, the integer part of the ratio of the offset of the first byte of the first portion divided by B (32 bytes) is calculated. This integer part is equal to 10 in the example illustrated on FIG. 3.

At step 404, the TCP analysis unit 207 determines whether the block sequence number corresponds to a block sequence number of a data block of the Pending Block list (incomplete data block).

If the block sequence number does not correspond to a block sequence number of a data block of the Pending Block list, then the length of the first portion is compared with B (32 bytes) at step 405.

If the length of the first portion is strictly less than B (as it is the case on the example illustrated on FIG. 3), then a free buffer is used to temporarily store, at step 406, the first portion and the block sequence number BSN is added to the Pending Block list.

If the length of the first portion is equal to B, then, it is checked at step 407 whether the first portion corresponds to data that has been previously received (redundant data) by testing the corresponding bits into the bitmap table 300.

If the first portion is not redundant data, then the data block of block sequence number BSN has been completely filled by the first portion, and is transmitted at step 408 to the content analysis unit 209 without waiting for all the data blocks having block sequence numbers that are lower than BSN to be completed. The corresponding bit into the bitmap table 300 is then set.

At step 411, it is checked whether the first portion is the last portion of the data sequence. If yes, the re-assembly is ended at step 413. If not, then the next portion of the data sequence is determined at step 412, and the steps are repeated from step 403 for the next portion.

If the first portion has been determined as being redundant data at step 407, the method goes directly to step 411.

If it has been determined at step 404 that the block sequence number BSN corresponds to a block of the Pending Block list, then the data of the first portion is copied at step 409 in the buffer corresponding to the block sequence number BSN.

At step 410, it is checked whether the data block of block sequence number BSN is complete after the first portion has been copied into it.

If the data block of block sequence number BSN is complete, it is transmitted at step 408 to the content analysis unit 209 without waiting for all the data blocks having block sequence numbers that are lower than BSN to be completed.

If the data block of block sequence number BSN is incomplete, then the next portion is determined at step 411.

Figure 5:
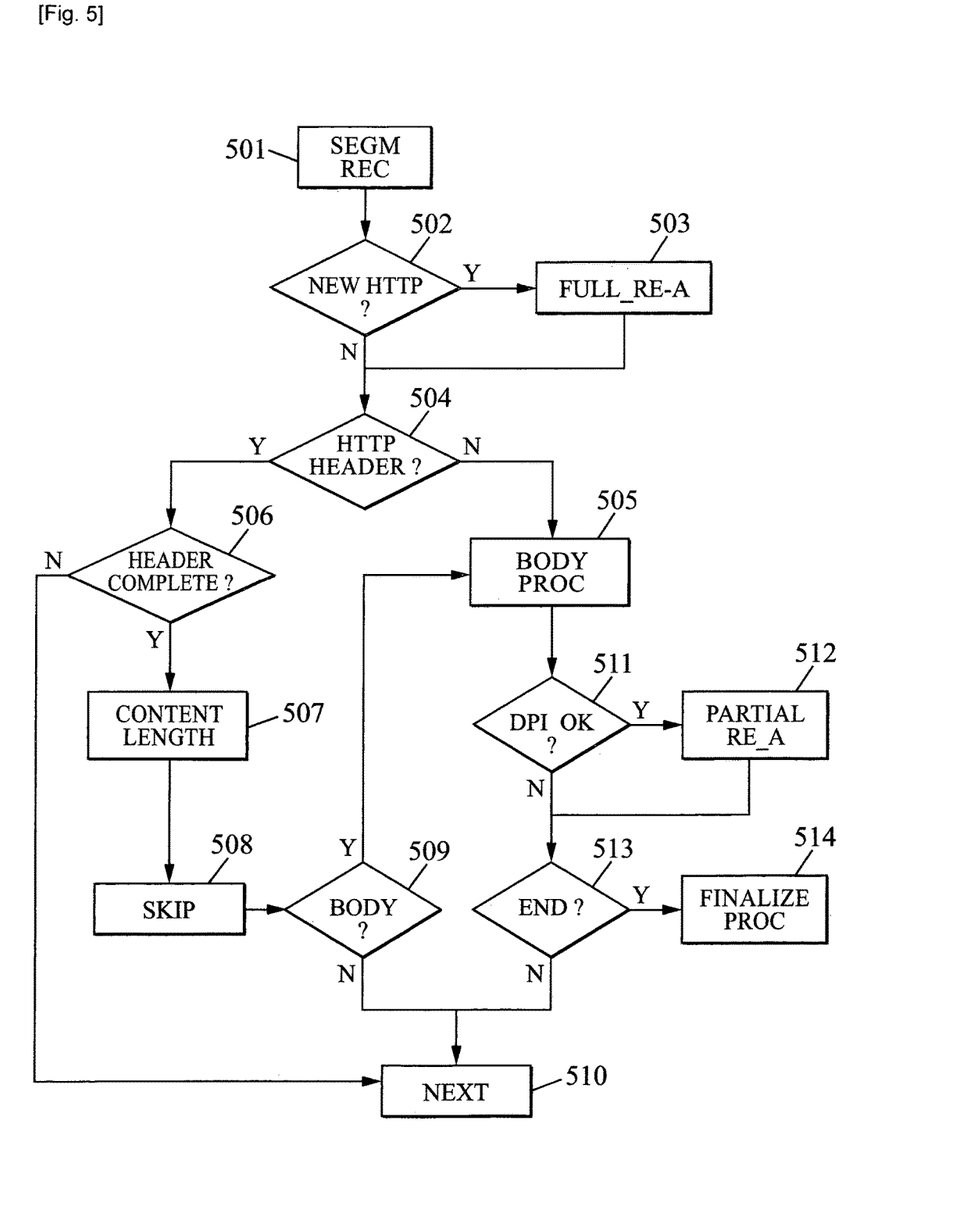
FIG. 5 illustrates the steps performed by an HTTP analysis unit according to one embodiment of the invention.

FIG. 5 is a diagram illustrating steps of a method according to some embodiments of the invention. In particular, it shows the steps that are performed by the HTTP analysis unit 208, upon reception of a TCP segment carrying a HTTP session. Standard operations related to TCP protocol such as connection identification, TCP context allocation and standard re-assembly are not detailed in what follows. The HTTP analysis unit 208 may comprise separate units dedicated to respective directions (uplink and downlink).

At step 501, a TCP data segment is received by the HTTP analysis unit 208.

At step 502, it is determined whether the TCP data segment transports a new HTTP request. If the TCP data segment transports a new HTTP request, then full reassembly can be activated at step 503.

At step 504, it is checked whether the TCP data segment transports at least a part of a HTTP header.

If yes, it is determined at step 506 whether the HTTP header is complete (or if the data segment enables to complete a part of the HTTP header received in a previous TCP data segment) or not.

If the HTTP header is complete, then the length of the HTTP content can be determined at step 507.

If the HTTP header is incomplete, the method goes directly to step 510 detailed hereafter.

Following step 507, the HTTP header is skipped at step 508, and it is determined, at step 509, whether the TCP segment also transports a part of the HTTP body. If not, the method goes directly to step 510, where a next TCP data segment is received.

If it has been determined at step 504 that the TCP data segment does not comprise data from the HTTP header, or at step 509 that the TCP data segment contains data of the HTTP body, then the data segment is transmitted at step 505 to the TCP analysis unit 207 to perform the steps illustrated on FIG. 4 (if partial re-assembly is activated) or to perform full re-assembly (if full re-assembly is activated).

Then, at step 511, it is determined whether all the data of the HTTP content that is required to perform the classification methods of the second category (the DPI analysis methods) has been received. As explained, the DPI analysis methods might be performed on the first K bytes (for example the first 1000 bytes) of the HTTP body, and the blocks comprising the first K bytes have to be re-ordered (full re-assembly).

If all the data of the HTTP content that is required to perform the classification methods of the second category has been received, then partial re-assembly is activated at step 512.

At step 513, it is verified if the HTTP content has been completely received. If yes, then the processing of the classification device 14 may be finalized and the result of the classification can be sent to the central supervisor 15 at step 514.

If the HTTP content has not been completely received, then method goes to step 510 for receiving a new TCP data segment.

Therefore, as explained, the full re-assembly procedure is only enabled for reception of the HTTP header and the beginning of the HTTP body. It is disabled as soon as the DPI classification methods do not require any more data. DPI classification methods are fed with in-order blocks as soon as the HTTP header has been completely received and correctly analyzed. The HTTP header is parsed and checked against the protocol grammar as detailed in the RFC2616. In particular, the Content-Length field of the header is extracted and checked in order to locate the end of the HTTP body part.

Figure 6:
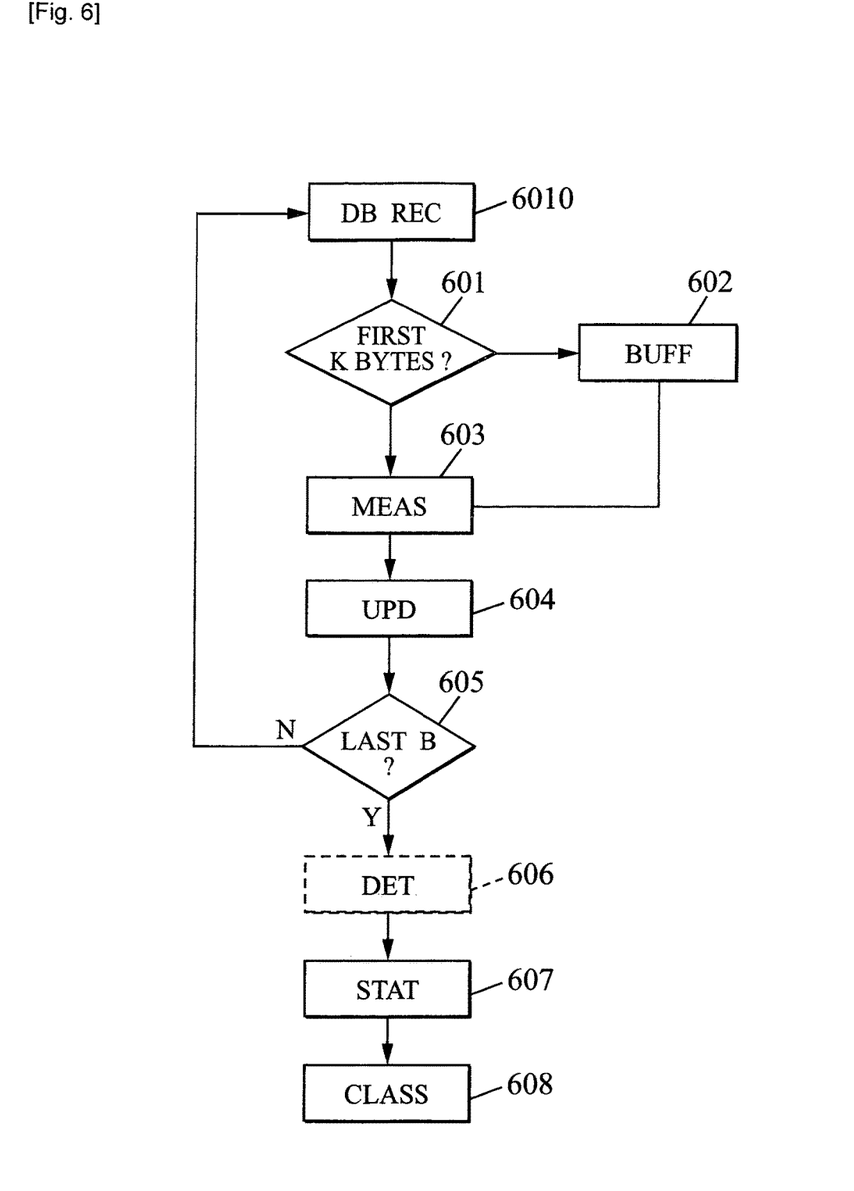
FIG. 6 illustrates the steps performed by a content analysis unit according to one embodiment of the invention.

FIG. 6 is a diagram illustrating steps of a method according to some embodiments of the invention. In particular, it shows the steps that are performed by the content analysis unit 209, upon reception of a complete data block (from the TCP analysis unit 207 performing step 408 of FIG. 4).

At step 600, the content analysis unit 209 receives a complete data block of size B.

At step 601, it is determined whether the received data block comprises data from the first K bytes of the HTTP content. If yes, then the received data block is useful for the classification methods of the second category and can be appended to a buffer at step 602.

At step 603, at least one measurement is performed on the received data block to obtain a measurement result and to update a statistical analysis of the HTTP content. The measurement can consist in determining the entropy of the data block or measuring the CHI-square deviation of the data block. Then a global entropy value of the data stream can be updated based on the newly determined entropy of the data block, or a counter value can be incremented if the CHI-square deviation is greater than a threshold as explained hereafter.

At step 604, at least one statistical analysis is updated based on the measurement result.

At step 605, it is determined whether the received complete data block is the last block of the content (if all the blocks of the content have been received).

If the received complete block is not the last block, the method goes back to step 600 to receive a new complete data block.

If the received complete block is the last block, then the deterministic classification methods of the second category can be optionally performed based on the first K bytes stored in buffer (step 606).

At step 607, the result of the statistical analysis is extracted, based on the last update performed at step 604, and therefore based on the measurement results obtained for all the received complete data blocks. Several results can be extracted if several statistical analyses are performed (CHI-square deviation and entropy estimation). For example, for the entropy estimation, an average value of the respective entropies of all the data blocks can be calculated to obtain a global entropy value of the content. For the CHI-square deviation method, the CHI-square deviation of each complete data block can be compared with a predetermined deviation threshold and a counter value (starting from 0) can be incremented each time the CHI-square deviation is above the predetermined deviation threshold. The counter value can then be compared to a predetermined integer N, as explained hereafter.

Alternatively, at step 605, it can be determined whether a threshold number of blocks have been completed. Indeed, the statistical analysis does not require to be performed on all the data blocks of a data stream, and can be significant in case a minimum number of blocks have been analyzed to determine measurement results.

At step 608, based at least on the result of one statistical analysis, the content is classified into one group among a plurality of groups. However, the present invention can also rely on several statistical analyses (first category), and on complementary deterministic methods (second category) to classify the content, as it is illustrated on FIG. 7.

Figure 7:
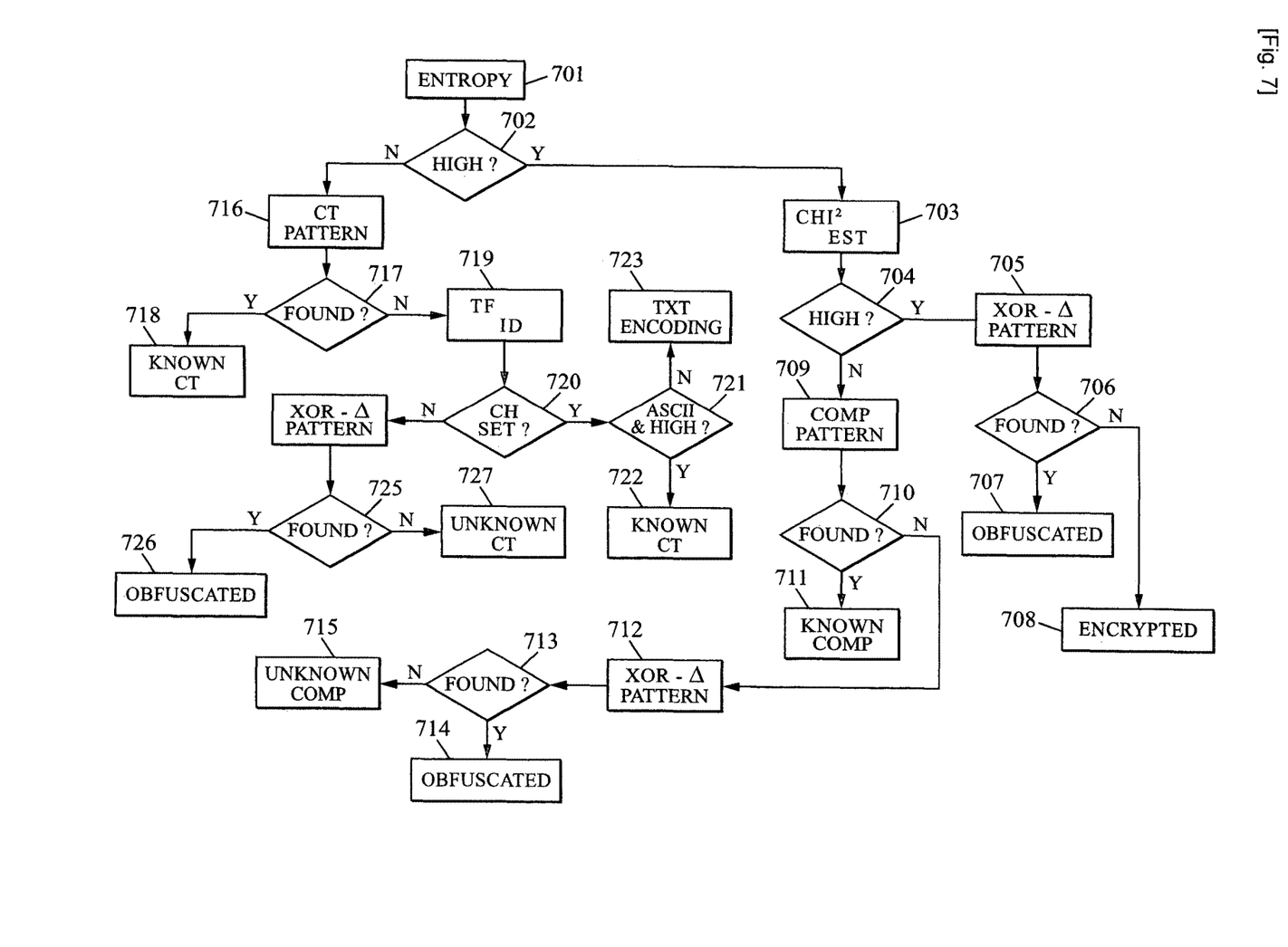
FIG. 7 illustrates the classification steps to classify a data stream into a group among a plurality of groups.

FIG. 7 is an exemplary classification diagram implemented by the content analysis unit when performing step 608 illustrated on FIG. 6.

At step 701, the global entropy value of the content is retrieved, and is compared at step 702 with a first predetermined entropy threshold (comprised between 0 and 8 for example).

If the global entropy value is "low" (i.e. less than the first predetermined entropy threshold), then the content can be classified as belonging to the cleartext data group.

If the entropy value is "high" (i.e. greater than the first predetermined entropy threshold), then the content can be classified as belonging to the non-cleartext data group (comprising the encryption group and the compressed data group).

The present invention therefore enables to differentiate between two groups of contents based on a statistical analysis performed after partial re-assembly of the data stream.

According to some embodiments, further classification methods can be used to improve the accuracy of the classification.

For example, the estimation of the CHI-square deviation can be retrieved at step 703, if it has been determined at step 702 that the global entropy value is high. The counter value described above is compared at step 704 to the predetermined integer N. If the counter value is greater than N, then the content can be classified as belonging to the encryption group, and if the counter value is equal to or less than N, the content can be classified as belonging to the compressed data group.

Therefore, by using a maximum of two statistical classification methods, the content can be classified into one group among three different groups.

If more accuracy is required, the present invention proposes to use deterministic methods (DPI analyses) in order to classify the content into subgroups of the above mentioned three main groups.

If it has been determined at step 704 that the counter value is higher than N, then XOR-delta pattern identification can be performed on the content (the first K bytes stored in the temporary buffer) at step 705.

If a XOR-delta pattern is found at a step 706 in the content, then the content can be classified as belonging to the obfuscated group at step 707. Else, the content can be classified as belonging to the encrypted data group at step 708.

If it has been determined at step 704 that the counter value is equal to or less than N, compressed pattern detection is performed on the content (the first K bytes in the temporary buffer) at step 709.

If a compressed pattern is found in the content at step 710, then the content can be classified as belonging to the known compressed format group at step 711.

Else, XOR pattern scan can be performed on the content (the first K bytes in the temporary buffer) at step 712.

If a XOR pattern is found at a step 713, then the content can be classified as belonging to the obfuscated group at step 714. Else, the content can be classified as belonging to the unknown compressed format group at step 715.

If it has been determined at step 702 that the global entropy value of the content is low, then cleartext pattern detection can be performed on the content (the first K bytes in the temporary buffer) at step 716.

If a cleartext pattern is found at a step 717, the content can be classified as belonging to the known cleartext format group at step 718.

Else, text file identification can be performed on the content (the first K bytes in the temporary buffer) at step 719.

If a character set is identified at a step 720, then it is determined if the character set is an ASCII character set with entropy higher than a second predefined threshold at step 721. If the character set is an ASCII character set and the entropy is higher than the second predefined threshold, then the content can be classified as belonging to the text encoding group at step 723. Else, the content can be classified as belonging to the known cleartext group at step 722.

If no character set has been found in the content at step 720, then a XOR pattern scan is performed on the content (the first K bytes in the temporary buffer) at step 724.

If a XOR pattern is found at step 725, then the content can be classified as belonging to the obfuscated group at step 726. Else, the content can be classified as belonging to the unknown cleartext format group at step 727.

Therefore, as described above, the statistical analysis can be executed on a large part of each content to obtain relevant result, while the deterministic classification methods (DPI analyses) can be executed only on a short part of the content (generally, the beginning of the content is sufficient). According to the embodiment illustrated on FIG. 6, the beginning of the content can be stored at step 602 in a temporary buffer. The steps of FIG. 7 can then be performed at the end of the content transfer, when the statistical analysis methods can provide accurate results. The temporary buffer is only used for the deterministic classification methods (DPI analyses).

The present invention can be embedded in a computer program product, which comprises all the features enabling the implementation of the methods described herein, and which, when loaded in an information processing system, causes the information processing system to be able to execute those methods. Computer program means or computer program in the present context mean any expression, in any language, code or notation, of a set of instructions intended to cause a system having an information processing capability to perform a particular function either directly or after the conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A method of performing a real-time classification of a data stream exchanged between a client and a server over a telecommunications network, the method comprising:
   receiving a data segment of the data stream, the data segment indicating a data offset within the data stream;
   updating a bitmap table with the received data segment based on the indicated data offset, wherein the bitmap table comprises a number of blocks of data having a predetermined size, the data blocks being ordered by block sequence numbers in the bitmap table;
   after updating the bitmap table, if at least one first data block of the received data segment having a first block sequence number is complete, performing at least one measurement used for statistical analysis on the complete data block to obtain at least one measurement result, and using the at least one measurement result to update a performance of at least one statistical analysis, without waiting for any of the data blocks of the received data segment having block sequence numbers that are lower than the first block sequence number to be completed; and
   classifying the data stream into one group among a plurality of groups, based on the at least one statistical analysis after the performance of the at least one statistical analysis has been updated based on the measurement results obtained for a predetermined number of complete blocks.

2. The method according to claim 1, wherein, for the first K bytes of the data stream, K being a predetermined number, the method further comprises:
   re-assembling the data blocks comprising the first K bytes of the data stream to obtain data blocks ordered according to their respective block sequence numbers;
   after the first K bytes of the data stream have been received and re-assembled, performing at least one Deep Packet Inspection (DPI) analysis on the first K bytes of the data stream;
   wherein the data stream is classified into a group based on the performed statistical analysis and on the DPI analysis.

3. The method according to claim 1, wherein the plurality of groups comprises a cleartext data group and at least one non-cleartext data group, wherein measurements performed on the complete data block comprises determining the entropy of said data block, and wherein the statistical analysis comprises determining a global entropy value for the data stream, wherein if the global entropy value is greater than a predetermined entropy threshold, the data stream is classified as belonging to the non-cleartext data group.

4. The method according to claim 3, wherein if the global entropy value is lower than the predetermined entropy threshold, the data stream is classified as belonging to the cleartext data group.

5. The method according to claim 3, wherein if the global entropy value is lower than the predetermined entropy threshold, the DPI analysis comprises a cleartext pattern detection to find a cleartext pattern in the data stream, wherein if a cleartext pattern is found in the data stream, the data stream is classified as a known cleartext format group, the known cleartext format group being a subgroup of the cleartext data group.

6. The method according to claim 5, wherein if no cleartext pattern is found in the data stream, the DPI analysis further comprises a text file identification analysis to find a character set in the data stream, and wherein:
   if a character set is found in the data stream, the data stream is classified as belonging to a text encoding group or to the known cleartext format group;
   else the data stream is classified as belonging to an obfuscated data group or to an unknown cleartext format group.

7. The method according to claim 1, further comprising transmitting an indication of the group into which the data stream is classified to a central supervisor in charge of applying filtering policies to data streams exchanged between the client and the server.

8. The method according to claim 1, wherein after having received the first K bytes of the data stream, K being a predetermined integer, the method comprising storing the first K bytes in a temporary buffer,
wherein the stored first K bytes are re-assembled, and wherein a Deep Packet Inspection (DPI) analysis is performed on the re-assembled stored first K bytes after the statistical analysis.

9. The method according to claim 1, wherein the bitmap table has a fixed size and starts at a bottom of window, wherein the method further comprises, upon reception of an acknowledgment message exchanged between the server and the client, the acknowledgment message indicating a new bottom of window, updating the bitmap table so that the bitmap table starts at the indicated new bottom of window.

10. A computer program product comprising a non-transitory computer readable medium having stored thereon computer program instructions loadable into a computing device and adapted to—when loaded into and executed by said computing device—cause the computing device to perform a method according to claim 1.

11. A method of performing a real-time classification of a data stream exchanged between a client and a server over a telecommunications network, the method comprising:
    receiving a data segment of the data stream, the data segment indicating a data offset within the data stream;
    updating a bitmap table with the received data segment based on the indicated data offset, wherein the bitmap table comprises a number of blocks of data having a predetermined size, the data blocks being ordered by block sequence numbers in the bitmap table;
    after updating the bitmap table, if at least one first data block having a first block sequence number is complete, performing measurements on the complete data block to obtain at least one measurement result without waiting for all the data blocks having block sequence numbers that are lower than the first block sequence number to be completed;
    performing at least one statistical analysis based on measurement results obtained for several complete blocks;
    classifying the data stream into one group among a plurality of groups, based on the performed statistical analysis at least,
    wherein the plurality of groups comprises a cleartext data group and at least one non-cleartext data group, wherein measurements performed on the complete data block comprises determining the entropy of said data block, and wherein the statistical analysis comprises determining a global entropy value for the data stream, wherein if the global entropy value is greater than a predetermined entropy threshold, the data stream is classified as belonging to the non-cleartext data group;
    wherein the non-cleartext data group comprises at least an encryption group, and wherein the measurements further comprises performing an estimation of a CHI-square deviation of the complete blocks, wherein the statistical analysis further comprises, for each complete block:
    determining a CHI square deviation of said complete block;
    comparing the determined CHI-square deviation to a predetermined deviation threshold;
    if the determined CHI-square deviation is greater than the predetermined deviation threshold, incrementing a counter value;
    wherein if the counter value is less than a predetermined integer N, the data stream is classified into the encryption group.

12. The method according to claim 11, wherein, if the counter value is less than a predetermined integer N, the data stream is classified into the encryption group, the DPI analysis comprises a XOR pattern scan to find a XOR pattern in the data stream,
    wherein if a XOR pattern is found in the data stream, the data stream is classified into an obfuscated group, and if no XOR pattern is found in the data stream, the data stream is classified into an encrypted data group, the obfuscated group and the encrypted data group being subgroups of the encryption group.

13. The method according to claim 11, wherein if the counter value is more than the predetermined integer N, the DPI analysis comprises a compressed pattern identification to find a compressed pattern in the data stream,
    wherein if a compressed pattern is found in the data stream, the data stream is classified into a known compressed format group and if no compressed pattern is found in the data stream, the data stream is classified in an obfuscated group or in an unknown compressed format group.

14. A classification device performing a real-time classification of a data stream exchanged between a client and a server over a telecommunications network, the classification device comprising:
    an input interface for receiving a data segment of the data stream, the data segment indicating a data offset within the data stream;
    a processor, the processor being configured for performing the following steps:
        updating a bitmap table with the received data segment based on the indicated data offset, wherein the bitmap table comprises a number of blocks of data having a predetermined size, the data blocks being ordered by block sequence numbers in the bitmap table;
        after updating the bitmap table, if at least one first data block of the received data segment having a first block sequence number is complete, performing at least one measurement used for statistical analysis on the complete data block to obtain at least one measurement result, and using the at least one measurement result to update a performance of at least one statistical analysis without waiting for any of the data blocks of the received data segment having block sequence numbers that are lower than the first block sequence number to be completed; and
        classifying the data stream into one group among a plurality of groups, based on the at least one statistical analysis after the performance of the at least one statistical analysis has been updated based on the measurement results obtained for a predetermined number of complete blocks.

15. A system comprising a classification device according to claim 14 and a central supervisor, wherein the classification device is configured to transmit an indicator of the group into which the data stream has been classified, and wherein, upon reception of the indicator, the central supervisor is configured to apply filtering rules in the telecommunications network based on the received indicator.

* * * * *